United States Patent
DePond et al.

(10) Patent No.: US 6,317,488 B1
(45) Date of Patent: Nov. 13, 2001

(54) CALL WAITING-CALLER IDENTIFICATION NOTIFICATION DEVICE

(75) Inventors: Paul F. DePond, San Mateo; Gaylan Larson, San Jose, both of CA (US)

(73) Assignee: Notify Corporation, San Jose, CA (US)

( * ) Notice: Subject to any disclaimer, the term of this patent is extended or adjusted under 35 U.S.C. 154(b) by 0 days.

(21) Appl. No.: 09/436,912

(22) Filed: Nov. 9, 1999

(51) Int. Cl.[7] .............. H04M 1/64; H04M 1/56; H04M 3/42
(52) U.S. Cl. .............. 379/93.35; 379/67.1; 379/88.11; 379/142.08; 379/215.01
(58) Field of Search .............. 379/67.1, 88.11, 379/88.12, 88.17, 88.19, 93.35, 201, 210–212, 215, 201.01, 210.11, 215.01, 142.08; 370/352, 389, 401, 404, 427, 259

(56) References Cited

U.S. PATENT DOCUMENTS

| | | | |
|---|---|---|---|
| 4,405,829 | 9/1983 | Rivest et al. | 178/22.1 |
| 5,111,502 | 5/1992 | McClure et al. | 379/380 |
| 5,805,587 | * 9/1998 | Norris et al. | 370/352 |
| 5,905,959 | * 5/1999 | Foladare et al. | 455/445 |
| 5,923,731 | 7/1999 | McClure | 379/33 |
| 5,982,774 | * 11/1999 | Foladare et al. | 370/401 |
| 6,067,353 | * 5/2000 | Szeliga | 379/93.35 |
| 6,134,590 | * 10/2000 | Perlman | 709/228 |
| 6,144,644 | * 11/2000 | Bajzath | 370/259 |

OTHER PUBLICATIONS

*Hot Call Plus (HC3000) Users Manual* from Command Communications (cover page with 5 additional pages).

Actiontec Electronics Call Waiting Modem website product and service information including Call Waiting Tutorial and Frequently Asked Questions about Call Waiting Modems (15 pages).

* cited by examiner

Primary Examiner—Allan Hoosain
(74) Attorney, Agent, or Firm—Marger Johnson & McCollom, P.C.

(57) ABSTRACT

An Internet Call Waiting Device (ICW) detects a Call Waiting signal even when a modem is currently using the phone line. Upon sensing the Call Waiting signal, the internet Call Waiting device alerts the user using one or more flashing lights and/or generating audible signals that the user can hear. If the user has a Call Waiting-Caller ID service the caller's name and number are also displayed if it is available from the phone company. After being notified, the user can choose to ignore the call or take the call by picking up a telephone. If the user picks up the telephone, the ICW signals the central office to put the first modem connection on hold. A connection is then made with the second call. When the second call is completed and the user hangs up the telephone for the second call, the ICW signals the central office to reconnect the first modem call. The ICW includes a signal detector for detecting a Call Waiting or Call Waiting-Caller ID signal on the phone line. A switch automatically disconnects the modem from the phone line when a Call Waiting-Caller ID signal is detected by the signal detector. A signal generator then enables a central office switch to transmit Caller ID information while the modem is disconnected from the phone line.

19 Claims, 5 Drawing Sheets

CALL WAITING-CALLER IDENTIFICATION NOTIFICATION DEVICE

BACKGROUND OF THE INVENTION

This invention relates to a system that provides Call Waiting notification when a phone line is currently being used by a computer modem.

Many residential Internet users only have one phone line into their homes. That one phone line is used for voice calls and modem based Internet calls. Frequently users are torn between logging onto the Internet via their computer modems or waiting for an expected phone call. Telephone companies provide a service called Call Waiting that notifies users of an incoming call while talking to a first caller. Call Waiting prevents a user that only has one phone line from missing important calls.

The Call Waiting service sends a signal on the phone line to notify the user of the incoming call. The user then has the option to either take the incoming call and put the current call on hold or to ignore the incoming call. An advanced version of this service is called Call Waiting-Caller ID. Call Waiting-Caller ID sends an alerting signal when a second call is coming in and also displays on a special Caller ID device, the name and number of the incoming caller.

When a modem is currently in use on the phone line, the user cannot hear the Call Waiting tone and therefore is not notified of the incoming call. Products have been developed that sense a Call Waiting tone from a central office switch when the phone line is currently being used for modem communications. A visual or audible indicator is then used to notify the user of the incoming call. These products however do not work with Call Waiting-Caller ID.

Accordingly, a need remains for a notification system that works in a Call Waiting-Caller ID environment to provide notification of incoming calls when the phone line is currently being used by a computer modem.

SUMMARY OF THE INVENTION

An Internet Call Waiting Device (ICW) detects a Call Waiting signal even when a modem is currently using the phone line. Upon sensing the Call Waiting signal, the internet Call Waiting device alerts the user using one or more flashing lights and/or generating audible signals that the user can hear. If the user has a Call Waiting-Caller ID service the caller's name and number are also displayed if it is available from the phone company. A Liquid Crystal Display (LCD) or other type of digital display can also be used to notify a user of a waiting call. For example, a digital display is used in some phone systems for displaying Caller-ID information. The same digital display can be used to identify a Call Waiting condition for systems without Caller-ID.

After being notified, the user can choose to ignore the call or take the call by picking up a telephone. If the user picks up the telephone, the ICW signals the central office to put the first modem connection on hold. A connection is then made with the second call. When the second call is completed and the user hangs up the telephone for the second call, the ICW signals the central office to reconnect the first modem call. If the invention is used with a speaker phone, a user simply presses a button to talk with the caller via a speaker without physically picking up the telephone handset.

The ICW includes a signal detector for detecting a Call Waiting or Call Waiting-Caller ID signal on the phone line. A switch automatically disconnects the modem from the phone line when a Call Waiting-Caller ID signal is detected by the signal detector. A signal generator then enables a central office switch to transmit Caller ID information while the modem is disconnected from the phone line.

The foregoing and other objects, features and advantages of the invention will become more readily apparent from the following detailed description of a preferred embodiment of the invention which proceeds with reference to the accompanying drawings.

DETAILED DESCRIPTION

Figure 1:
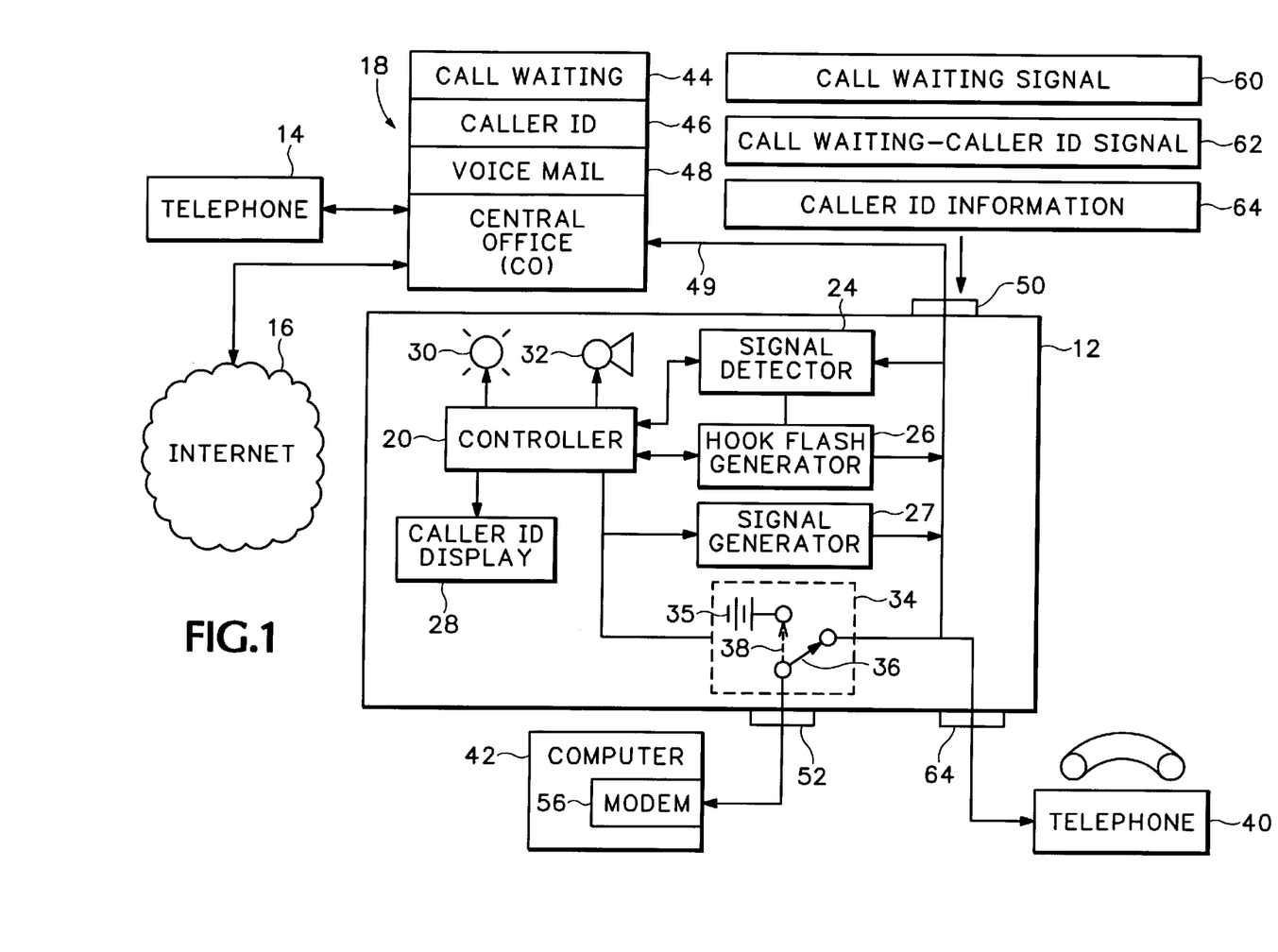
FIG. 1 is diagram of an Internet Call Manager according to the invention.

A communications network includes a Central Office Switch (CO) 18. A telephone 40 or a computer 42 is connected to another telephone 14 or to the Internet 16 through the CO 18. The CO 18 provides additional telecommunication services such as a Call Waiting service 44, a Caller ID service 46 and a voice mail service 48. These services provided by the CO 18 are well known to those skilled in the art and are therefore not described in further detail.

The invention comprises an Internet Call Manager (ICM) 12 that has one jack 50 that connects to the CO 18 by a telephone line 49 in a Public Services Telephone network (PSTN). Another jack 54 is connected to the "local" telephone set 40 and a third jack 52 is connected to the modem 56 that is used to connect a computer 42 to the Internet 16 or some other data connection. The ICM 12 can be a stand alone adjunct or built into the telephone set 40.

The ICM 12 includes a signal detector 24, a signal generator 27, and a hook flash generator 26 each connected to the telephone line 49. A controller 20, can be a microprocessor or discrete logic that activates indicators, such as a light 30 or an audible signal generator 32. The indicators 30 and 32 are activated by the controller 20 according to the signals detected by the signal detector 24. The controller 20 also can forward Caller-ID information to a display 28. A switch 34 is controlled by the controller 20 for connecting the modem 56 to either the telephone line 49 or to an internal power supply 35.

Figure 2:
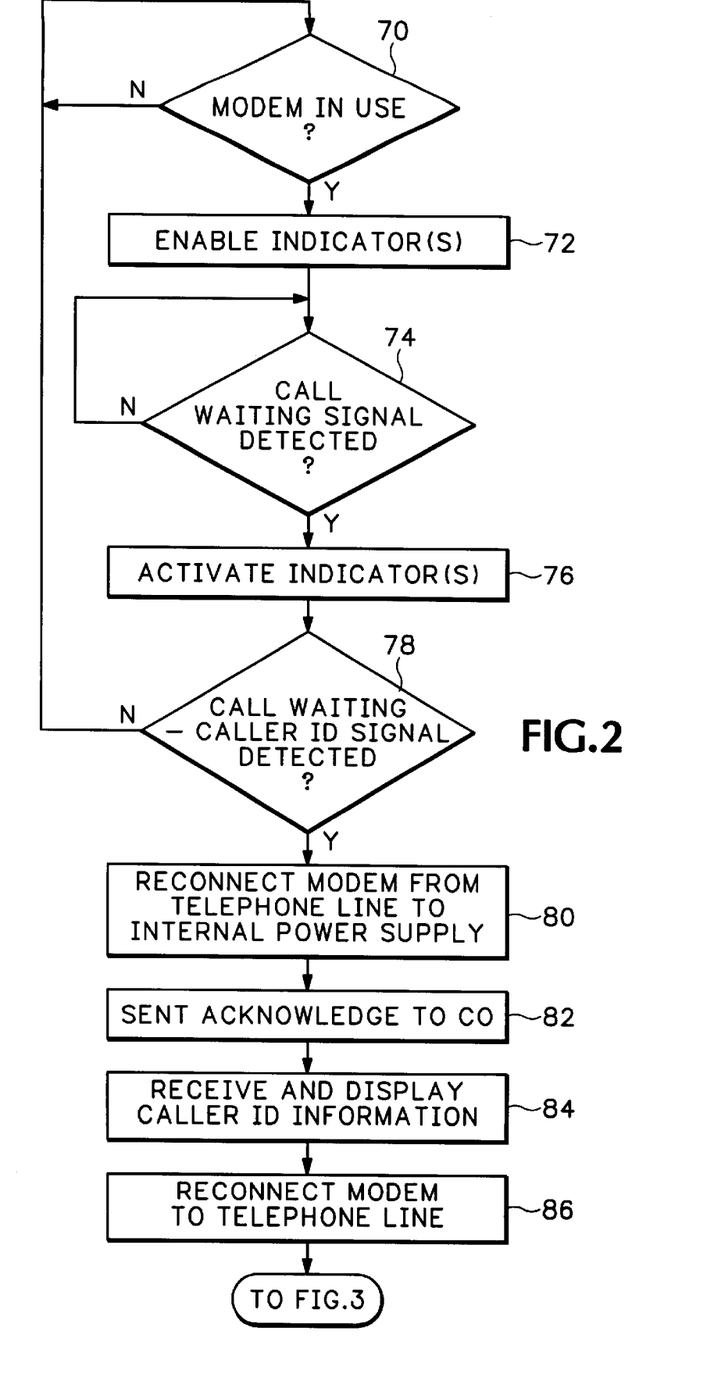
FIGS. 2 and 3 are flow diagrams showing how the Internet Call Manager FIG. 1 operates.

Referring to FIGS. 1 and 2, the ICM 12 operates in the following manner. The ICM 12 detects when the modem 56 is being used in decision block 70. When the modem 56 is being used, the ICM 12 enables the audible alert and/or visual alert feature in block 72. If, while the modem 56 is in use, a second call, say from telephone 14, is made to telephone 40 over telephone line 49, the central office generates a Call Waiting signal 60 on the telephone line 49. The Call Waiting tone 60 in one example comprises a 440 Hertz Subscriber Alerting Signal (SAS).

If the Call Waiting signal 60 is detected by the signal detector 24 in decision block 74, the controller 20 activates either the light 30 or audible annunciator 32, or both, in block 76. This alerts user at computer 42 that an incoming call is waiting.

The Call Waiting detector 24 also listens for a Call Waiting-Caller ID signal 62 in decision block 78. The Call Waiting-Caller ID signal 62, in one example, is a 2.13 KHz and 2.75 KHz Customer Premise Equipment Alerting Signal (CAS) generated by the CO 18. If the Call Waiting-Caller ID signal 62 is detected, the controller 20 in block 80 moves switch 34 into position 38 temporarily disconnecting the modem 56 from the telephone line 49.

The switch 34 connects the modem 56 to an internal power source 34 while disconnected from the telephone line 49. This prevents the modem 56 from disconnecting and shutting down while disconnected from the telephone line 49. The modem 56 can then be reconnected to the Internet 16 after it is reconnected to the phone line 49.

The ICM 12 acknowledges the detected CAS tone 62 by generating a particular DTMF tones from signal generator 27 in block 82. The DTMF acknowledgement notifies the CO switch 18 to send down Caller ID information 64. In one example, the Caller ID information 64 is sent using Frequency Shift Keying (FSK) signaling. The Caller ID information 64 is received by the ICM 12 and then output on display 28 in block 84. The modem 56 is then reconnected to the telephone line 49 by the controller 20 by directing switch 34 back into position 36 in block 86.

Figure 3:
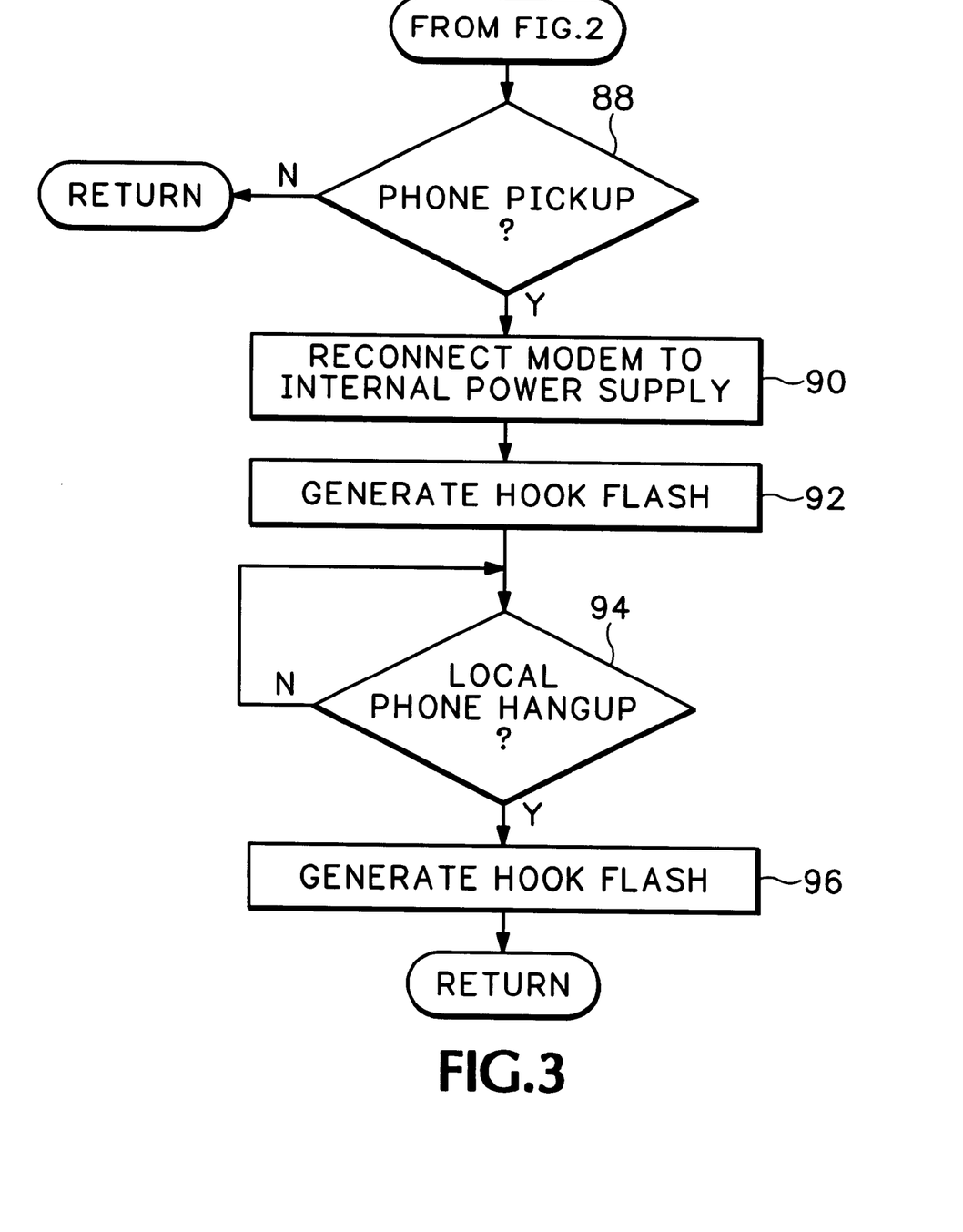

Referring to FIGS. 1 and 3, the ICM 12 monitors the local phone 40 to see if the receiver on telephone 40 gets picked up in decision block 88. This indicates that the user wants to take the incoming call. If the local phone 40 is picked up, the ICM 12 in block 90 again disconnects the modem 42 from the telephone line and powers the modem 42 internally to prevent it from shutting down. A hook flash is immediately generated on the telephone line 49 by the hook flash generator 26 in block 92. The hook flash signals the CO switch 18 that the user wants to put the current connection (modem connection) on hold and make a connection to the incoming caller. By the time the user gets the phone 40 to their ear, the incoming call should be connected.

If the ICM 12 did not disconnect the modem 56 from the telephone line 49, a hook flash could not be generated. Therefore, simply picking up telephone 40 while attached to the same line 49 as the modem 56 and attempting to generate a hook flash would not be successful. Also, if the modem 56 is not disconnected from the phone line 49 by the ICM 12, the user would continue to hear the signals generated by the modem 56. This would prevent the user from conversing with the incoming caller.

The ICM 12 monitors the phone line 49 to detect when the user hangs up the local phone 40 in decision block 94. When the user hangs up local phone 40, the ICM 12 generates another hook flash in block 96 signaling the CO switch 18 to reconnect the modem 56 to its previous connection that was put on hold by the previous hook flash. The modem 56 is automatically reconnected to the phone line 49 when the hook flash is completed. The ICM 12 then returns to decision block 70.

Call Waiting Deluxe

Figure 4:
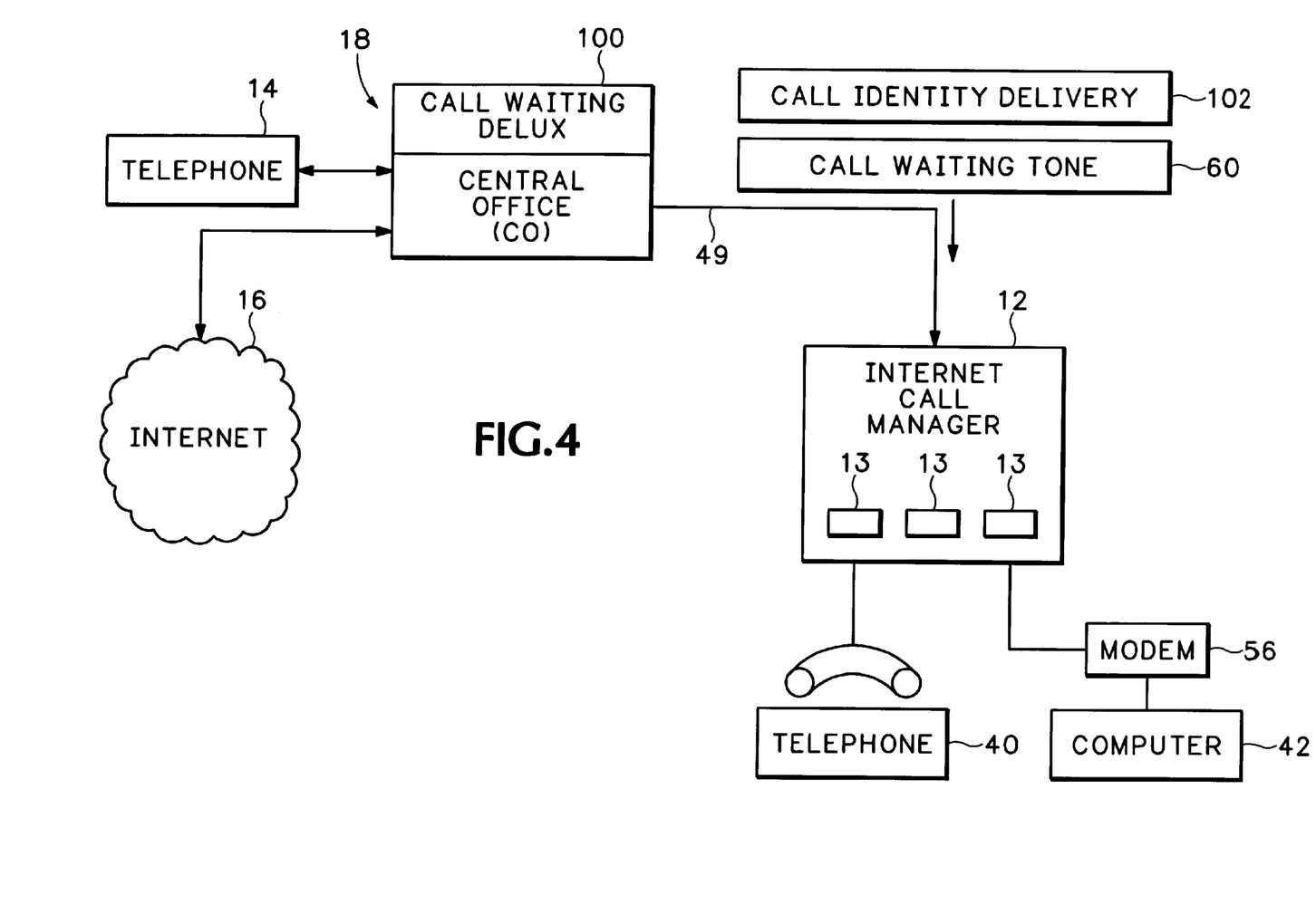
FIG. 4 is a schematic diagram showing a Call Waiting Deluxe feature for Internet Call Manager.
Figure 5:
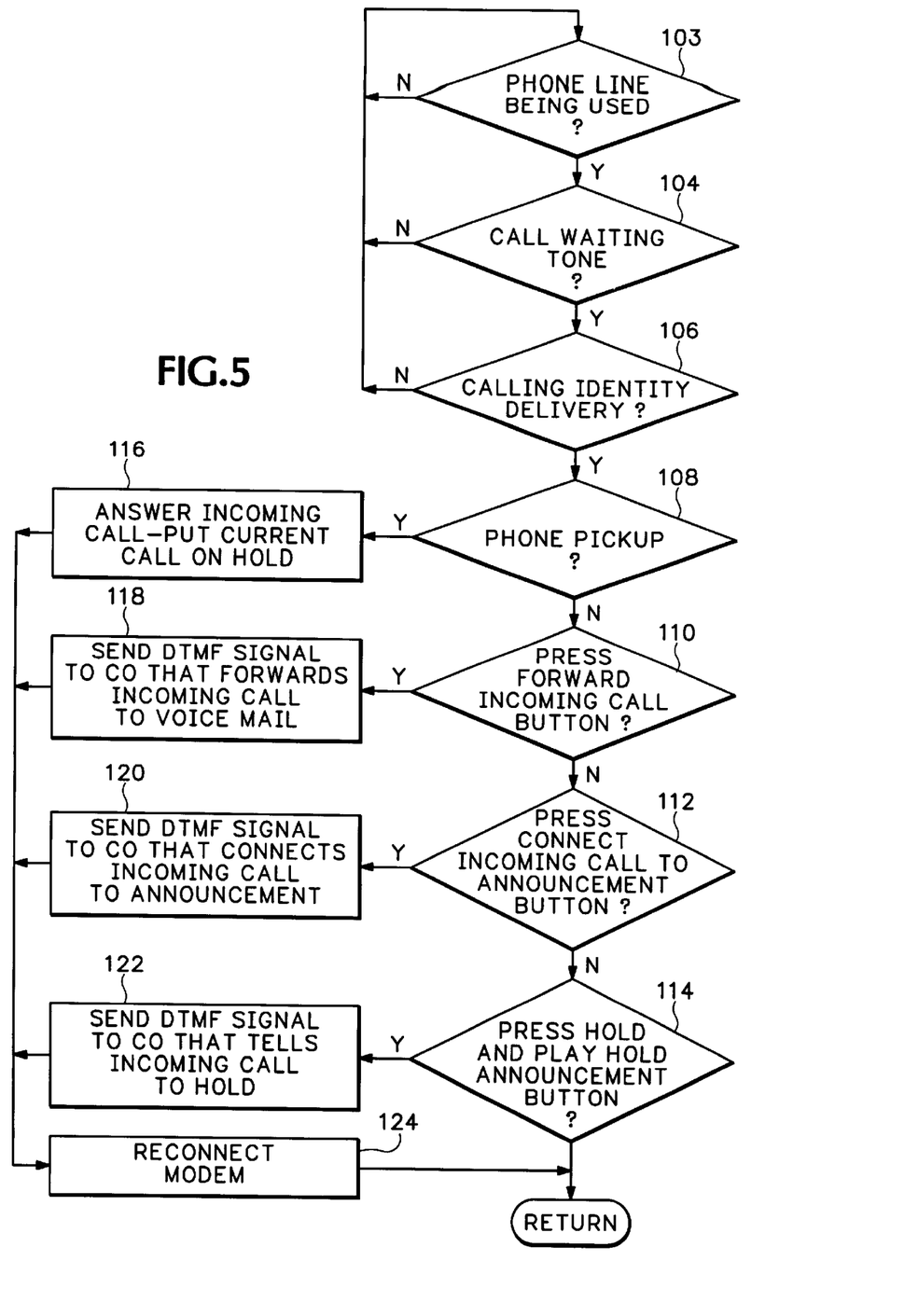
FIG. 5 is a flow diagram showing how the Call Waiting Deluxe feature operates.

Referring to FIGS. 4 and 5, the ICM 12 can be used with a Call Waiting Deluxe (CWD) Service 100. CWD 100 is a Stored Program Control System (SPCS) that runs on the CO switch 18. Buttons 13 on the ICM 12 allow a phone customer 40 to control the treatment of incoming calls while the customer is off-hook on an existing call.

The ICM 12 detects when the phone customer is currently making a call in decision block 103. For example, the modem 56 may be connected to the Internet 16 or the phone customer may simply be talking to another caller. If a second call comes into the CO 18 for phone 40, CWD 100 notifies phone 40 by sending the standard Call Waiting tone 60 over phone line 49. If the customer has a Calling Identity Delivery (CID) feature (Call Waiting Deluxe), CID data 102 is sent to the phone 40 immediately following the Call Waiting tone 60.

The ICM 12 detects the Call Waiting tone 60 in decision block 104 and then detects the CID data 102 in decision block 106. After being alerted of the new call, the customer may choose one of the following options for treating the incoming call by pressing different buttons 13 on the ICM 12.

If none of buttons 13 are pressed, but the ICM 12 detects a phone pick up and the modem 56 is in use in decision block 108, the current call is put on hold and the incoming call is connected in block 116. The ICM 12 does this automatically when the local phone 40 is picked up. The ICM automatically disconnects the modem 56, if connected to the phone line 49 and then reconnect the modem to the phone line 49 after the user hangs up phone 40.

The phone may not be picked up but a first "Forward The Incoming Call" button 13 may be depressed in decision block 110. If the current call is a modem call, the modem 56 is disconnected from the phone line 49 and connected to the internal power supply 35 (FIG. 1). A hook flash followed by a first Dual Tone Multiple Frequency (DTMF) signal is then automatically generated by the signal generator 27 (FIG. 1) in block 118. The DTMF signal causes the CO switch 18 to forward the incoming call, usually to Voice Mail. After sending the DTMF signal, the ICM 12 reconnects the modem, if applicable, to the phone line 49.

The ICM 12 detects when a second "Connect the Incoming Call to An Announcement" button 13 is pressed in decision block 112. A hook flash followed by a different DTMF signal is then generated by the ICM 12 causing the CO switch 18 to play an announcement to the incoming call. This announcement could tell the caller that the user is busy or on the Internet or possibly some other announcement. The ICM 12 then reconnects the modem 56, if active, in block 124.

The ICM 12 detects when a third "Put the Incoming Call on Hold and Play a Hold Announcement" button 13 is depressed in decision block 114. A hook flash followed by another DTMF tone is then automatically generated by the ICM 12 that causes the CO switch 18 to play an announcement to the incoming call asking the caller to please hold.

If one of the buttons 13 is depressed, the ICM 12 first disconnects the modem 56, if applicable, from the telephone line 49. After the hook flash and DTMF tone associated with the pressed button 13 is depressed, the modem is reconnected to the telephone line 49 in block 124. The Call Waiting Deluxe features operate with the functions described above in FIGS. 1–3.

Thus, the ICM 12 provides incoming call notification with Call Waiting, Call Waiting Deluxe, and Call Waiting Caller ID all while the telephone line 49 is being used by a computer modem.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A telephone call manager, comprising:
    a signal detector that detects when a Call Waiting-Caller ID signal is generated on a phone line at a local phone location;

a switch that connects and disconnects the modem from the phone line;

a signal generator at the local phone location that acknowledges receipt of the Call Waiting-Caller ID tone enabling Call-Waiting Caller ID signals to be sent directly over the same phone line at the same local phone location; and a controller at the local phone location causing the switch to disconnect the modem from the phone line and causing the signal generator to acknowledge the Call Waiting-Caller ID signal when the Call Waiting-Caller ID signal is detected, the controller then receiving Caller ID information over the phone line while the modem is disconnected and then automatically causing the switch to reconnect the modem to the phone line after the Caller ID information is received.

2. A telephone call manager according to claim 1 including an indicator or alarm that is automatically activated by the controller when the displaying the Call Waiting-Caller ID signal that is sent directly from a central office to the phone location and is detected at the local phone location.

3. A telephone call manager according to claim 2 wherein the indicator is a character display identifying that a call is waiting.

4. A telephone call manager according to claim 3 wherein the controller automatically disconnects the modem from the telephone line and connects the modem to a power supply when a local phone pickup is detected.

5. A telephone call manager according to claim 4 wherein the hook flash generator automatically generates another hook-flash when a local phone hang up is detected.

6. A telephone call manager according to claim 1 including a hook flash generator that automatically generates a hook-flash on the phone line when a local phone pickup is detected.

7. A telephone call manager according to claim 1 including Call Waiting deluxe buttons that each cause the signal generator to send a different signal directing the central office to handle the incoming call differently.

8. A telephone call manager according to claim 7 wherein the signal generator generates different signals that initiate the following central office switch functions:

forward incoming call to voice mail;
connect incoming call to an announcement; or
notice the incoming call to hold.

9. A telephone call manager, comprising:

a signal detector that detects when a Call Waiting-Caller ID signal is generated on a phone line;

a switch that connects and disconnects the modem from the phone line;

a signal generator that acknowledges receipt of the Call Waiting-Caller ID tone;

a controller causing the switch to disconnect the modem from the phone line and causing the signal generator to acknowledge the Call Waiting-Caller ID signal when the Call Waiting-Caller ID signal is detected, the controller then receiving Caller ID information over the phone line while the modem is disconnected and then automatically causing the switch to reconnect the modem to the phone line after the Caller ID information is received;

Call Waiting deluxe buttons that each cause the signal generator to send a different signal directing the central office to handle the incoming call differently, wherein the signal generator generates different signals that initiate the following central office switch functions;

forward incoming call to voice mail;
connect incoming call to an announcement; or
notice the incoming call to hold; and
the controller disconnecting the modem from the phone line when generating any one of the different signals to the central office switch.

10. A telephone call manager, comprising:

a signal detector that detects when a Call Waiting-Caller ID signal is generated on a phone line;

a switch that connects and disconnects the modem from the phone line;

a signal generator that acknowledges receipt of the Call Waiting-Caller ID tone; and a controller causing the switch to disconnect the modem from the phone line and causing the signal generator to acknowledge the Call Waiting-Caller ID signal when the Call Waiting-Caller ID signal is detected, the controller then receiving Caller ID information over the phone line while the modem is disconnected and then automatically causing the switch to reconnect the modem to the phone line after the Caller ID information is received; and an internal power supply that is connected to the modem by the switch when the modem is disconnected from the telephone line.

11. A system for detecting incoming calls when a phone line is connected to a local computer, comprising:

a signal detector for detecting a Call Waiting or Call Waiting-Caller ID signal on the phone line at a location of the local computer;

a switch that automatically disconnects the modem from the phone line when a Call Waiting-Caller ID signal is detected by the signal detector; and a signal generator that enables a central office switch to transmit Caller ID information over the phone line to the location of the local computer while the modem is disconnected from the phone line.

12. A system according to claim 11 including an indicator that is activated by the signal detector when the detector detects a Call Waiting signal.

13. A system according to claim 11 including a display for displaying the Caller ID information sent by the central office at the local computer location.

14. A system according to claim 11 wherein the switch maintains the modem in an offhook condition when disconnected from the phone line and then automatically reconnects the modem to the phone line when a local telephone is hung up.

15. A system for detecting incoming calls when a phone line is connected to a local computer, comprising:

a signal detector for detecting a Call Waiting or Call Waiting-Caller ID signal on the phone line;

a switch that automatically disconnects the modem from the phone line when a Call Waiting-Caller ID signal is detected by the signal detector;

a signal generator that enables a central office switch to transmit Caller ID information while the modem is disconnected from the phone line; and a hook flash generator that automatically generates a hook-flash on the phone line when a local telephone pickup or local speaker phone talk enable is detected, the switch at the same time causing the modem to disconnect from the phone line and connect to an internal power supply.

16. A telephone call manager for controlling incoming calls on a phone line, comprising:

a signal detector that detects a Call Waiting signal sent by a central office switch at a local phone line location;

a switch that automatically disconnects a modem from the phone line when the Call Waiting signal is detected at the local phone line location by the signal detector;

a signal generator that generates different tone sequences that provide Call directions to a central office switch from the local phone line location after the modem is disconnected from the phone line;

a set of Call Waiting buttons that direct the signal generator to generate different signals on the phone line that direct the central office switch to conduct different Call Waiting functions, the Call Waiting buttons at the same time causing the switch to disconnect the modem from the phone line and then reconnect the modem to the phone line after one of the different signals is generated by the signal generator.

17. A telephone call manager according to claim 16 wherein the different signals initiate the following Call Waiting functions:

forward incoming call to voice mail;

connect incoming call to an announcement; or notice the incoming call to hold.

18. A telephone call manager according to claim 16 including an indicator that is automatically activated when a Call Waiting signal is detected by the signal detector.

19. A telephone call manager according to claim 16 including a power supply to maintain the modem in an offhook condition when disconnected from the phone line.

* * * * *

UNITED STATES PATENT AND TRADEMARK OFFICE
CERTIFICATE OF CORRECTION

PATENT NO.    : 6,317,488 B1
DATED         : November 13, 2001
INVENTOR(S)   : DePond et al.

It is certified that error appears in the above-identified patent and that said Letters Patent is hereby corrected as shown below:

Column 5,
Line 13, "phone line while" should read -- phone line at the local phone location while --.
Line 19, "when the displaying the" should read -- when displaying the --.

Column 7,
Line 7, "Call directions" should read -- Call Waiting directions --.

Signed and Sealed this

Eighth Day of October, 2002

Attest:

JAMES E. ROGAN
Attesting Officer        Director of the United States Patent and Trademark Office